Patented July 25, 1950

2,516,302

UNITED STATES PATENT OFFICE 2,516,302

FLUORINE-CONTAINING AZO COMPOUNDS

Joseph B. Dickey, Rochester, N. Y., assignor to Eastman Kodak Company, Rochester, N. Y., a corporation of New Jersey No Drawing. Application November 28, 1945, Serial No. 631,468

7 Claims. (Cl. 260—207.5)

This invention relates to new azo compounds and their application to the art of coloring.

I have discovered that the azo compounds having the general formula:

$$R{-}N{=}N{-}R_1$$

wherein R represents a member selected from the group consisting of a benzene nucleus, a naphthalene nucleus, a benzothiazole nucleus and an azobenzene nucleus and $R_1$ represents a member selected from the group consisting of a benzene nucleus and a naphthalene nucleus and wherein the member $R_1$ contains a nuclear amino group which is substituted with an aliphatic hydrocarbon group containing a difluorinated carbon atom, constitute a valuable class of dye compounds. Depending upon their structure, the azo compounds of the invention possess application for the coloration of organic derivatives of cellulose, nylon, wool and silk. They yield dyeings having excellent light fastness.

While my invention relates broadly to the azo compounds having the formula above given, it relates more particularly to those compounds wherein R and $R_1$ are monocyclic benzene nuclei and especially to those compounds wherein R and $R_1$ are monocyclic benzene nuclei containing no nuclear sulfonic acid or carboxylic acid group and R contains a nitro group directly attached thereto in para position to the azo bond.

Both sulfonated and non-sulfonated compounds are included within the scope of my invention. The nuclear non-sulfonated compounds are of value for the coloration of organic derivatives of cellulose, especially cellulose acetate rayon, and nylon and it is to these compounds and their application for the coloration of organic derivatives of cellulose and nylon textile materials that my invention is particularly directed. The nuclear non-sulfonated compounds likewise possess some application for the dyeing of wool and silk. In general, the monoazo compounds wherein R and $R_1$ are monocyclic benzene nuclei free from nuclear sulfonic acid and carboxylic acid groups and wherein R contains a nitro group directly attached thereto in para position to the azo bond are especially advantageous for the coloration of organic derivatives of cellulose.

The nuclear sulfonated compounds of my invention have little or no utility for the coloration of organic derivatives of cellulose but possess application for the coloration of wool and silk. Red, orange, orange-yellow, brownish-red, blue-green, blue, rubine and violet shades, for example, can be obtained employing the dye compounds of the invention.

It is an object of my invention to provide a new class of azo compounds suitable for the coloration of organic derivatives of cellulose, nylon, wool and silk. Another object of my invention is to provide a process for the coloration of organic derivatives of cellulose, nylon, wool and silk. A further object is to provide colored textile materials which are of good fastness to light and washing. A particular object is to provide a new class of nuclear non-sulfonated azo compounds suitable for the coloration of cellulose acetate rayon. Another particular object is to provide colored cellulose acetate textile materials which are of good fastness to light and washing. A still further object is to provide a satisfactory process for the preparation of the azo compounds of my invention. Other objects will appear hereinafter.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose, such as cellulose acetate-propionate, cellulose acetate-butyrate, and the cellulose ethers such as methyl cellulose, ethyl cellulose, or benzyl cellulose. While the use of the compounds of my invention will be illustrated more particularly in connection with the coloration of cellulose acetate rayon, a material to which the invention is especially adapted, it will be understood that it applies to the coloration of the other materials mentioned herein.

The azo compounds of my invention can be prepared by coupling diazotized arylamines of the benzene and naphthalene series, diazotized aminobenzothiazoles and diazotized aminoazobenzenes with a coupling component of the benzene and naphthalene series containing a nuclear amino group which is substituted with an aliphatic hydrocarbon group containing a difluorinated carbon atom.

It is to be here noted that the terms difluoroethyl, trifluoroethyl, trifluoropropyl and trifluorobutyl wherever used herein means 2,2-difluoroethyl, 2,2,2-trifluoroethyl, 3,3,3-trifluoro-n-propyl and 4,4,4-trifluoro-n-butyl, respectively.

The following examples illustrate the azo compounds of my invention and their manner of preparation:

*Example 1.—1 - (4-nitrophenylazo) - 4-(N-β-hydroxyethyl-N-difluoroethyl-aminobenzene*

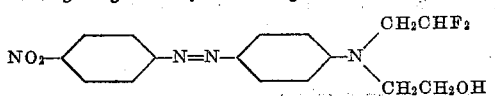

13.8 grams of p-nitroaniline are dissolved in 150 cc. of water and 25 cc. of 36% hydrochloric acid. The solution resulting is cooled to a temperature approximately 0–5° C. and the p-nitroaniline is diazotized while maintaining this temperature by the addition, with stirring, of a water solution of 6.9 grams of sodium nitrite.

20.1 grams of N-β-hydroxyethyl-N-difluoroethylaniline are dissolved in 200 cc. of cold dilute aqueous hydrochloric acid and the diazonium solution prepared as described above is gradually added with stirring. Following the addition of the diazonium solution the mixture resulting is stirred, while maintaining a temperature of 0°–10° C., for about 30 minutes after which the coupling reaction which takes place is completed by neutralizing the hydrochloric acid with sodium acetate. The dye compound formed is recovered by filtration, washed with water and dried. It colors cellulose acetate rayon and nylon red shades.

*Example 2.—1-(2-chloro - 4 - nitrophenylazo)-2-methyl-4-(N-β-hydroxyethyl - N - difluoroethyl)-aminobenzene*

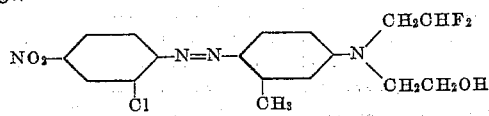

17.3 grams of o-chloro-p-nitroaniline are diazotized and the diazonium compound obtained is coupled with 21.5 grams of N-β-hydroxyethyl-N-difluoroethyl-m-toluidine. The diazotization, coupling and dye recovery operations can be carried out in accordance with the procedure described in Example 1. The dye compound obtained colors cellulose acetate rayon and nylon rubine shades.

*Example 3.—1-(4 - nitrophenylazo)-2 - chloro-4-(N-β-hydroxyethyl-N-difluoroethyl) - aminobenzene*

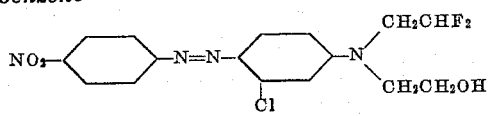

13.8 grams of p-nitroaniline are diazotized and the diazonium compound obtained is coupled with 23.5 grams of N-β-hydroxyethyl-N-difluoroethyl-m-chloroaniline. The diazotization, coupling and dye recovery operations can be carried out in accordance with the procedure described in Example 1. The dye compound obtained colors cellulose acetate rayon and nylon orange shades.

*Example 4.—1-(2,4-ditrifluoromethylphenylazo)-2-methyl-4-(N - β - hydroxyethyl - N - difluoroethyl)-aminobenzene*

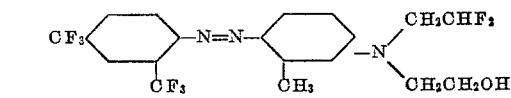

22.9 grams of 2,4-ditrifluoromethylaniline are diazotized and the diazonium compound obtained is coupled with 21.5 grams of N-β-hydroxyethyl-N-difluoroethyl-m-toluidine. The diazotization, coupling and dye recovery operations can be carried out in accordance with the procedure described in Example 1. The dye compound obtained colors cellulose acetate rayon and nylon rubine shades.

*Example 5.—1-(4-acetophenylazo)-2 - methyl-4-N-difluoroethylamino-benzene*

13.5 grams of p-aminoacetophenone are diazotized and the diazonium compound obtained is coupled with 25.1 grams of N-difluoroethyl-m-toluidine. The diazotization, coupling and dye recovery operations can be carried out in accordance with the procedure described in Example 1. The dye compound obtained colors cellulose acetate rayon and nylon orange shades.

*Example 6.—1 - (6-chloro-2,4-dinitrophenylazo(-2-acetamino-5-methoxy-4 - (N-β,γ-dihydroxypropyl-N-difluoroethyl)-aminobenzene*

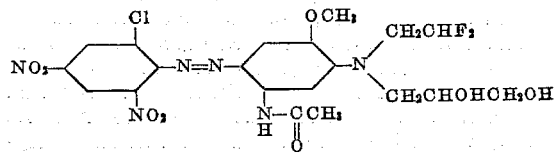

(A) 21.8 grams or 6-chloro-2,4-dinitroaniline are dissolved in 220 cc. of hot glacial acetic acid and the resulting solution is rapidly cooled to room temperature.

(B) 7 grams of sodium nitrite are dissolved in 53 cc. of sulfuric acid (sp. gr. 1.83) by heating the mixture to 70° C., and the resulting solution is then cooled to 15–20° C.

Solution (A) is added with stirring to (B) over a period of 30 minutes, while maintaining a temperature of 15–20° C. and the mixture resulting is then stirred for an additional hour at room temperature.

31.8 grams of N-β,γ-dihydroxypropyl-N-difluoroethyl-5-acetamino - 2 - methoxyaniline dissolved in cold dilute sulfuric acid and the diazonium solution prepared as described above is added slowly, with stirring, while maintaining the temperature at 0–10° C. The coupling reaction which takes place is completed by adding sodium acetate until the reaction mixture is substantially neutral to Congo red paper. The dye compound formed is recovered by filtration, washed with water and dried. It colors cellulose acetate rayon and nylon blue shades.

*Example 7.—1 - (2,6-dichloro-4-nitrophenylazo)-2 - chloro-4-N,N - di - (2,2-difluoro-n-propyl)-aminobenzene*

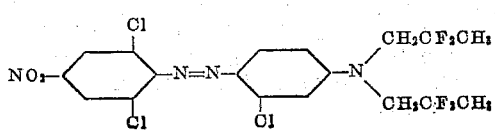

20.7 grams of 2,6-dichloro-4-nitroaniline are diazotized in known fashion and the diazonium compound obtained is coupled in a dilute sulfuric acid solution, for example, with 28.3 grams of N,N-di - (2,2-difluoro-n-propyl)-m-chloroaniline. The dye compound obtained colors cellulose acetate rayon and nylon brownish-red shades.

*Example 8.—1-(4-nitrophenylazo)-4-N - 2,2 - difluoro-n-propylaminobenzene*

13.8 grams of p-nitroaniline are diazotized and the diazonium compound obtained is coupled with 17.1 grams of N-2,2-difluoro-n-propylaniline. The diazotization, coupling and dye recovery operations can be carried out in accordance with the procedure described in Example 1. The dye compound obtained colors cellulose acetate rayon and nylon red shades.

*Example 9.—1-(4-nitrophenylazo)-4-N-(3,3 - difluoro-n-butyl)-aminobenzene*

13.8 grams of p-nitroaniline are diazotized and the diazonium compound obtained is coupled with 18.5 grams of N-(3,3-difluoro-n-butyl)-aniline. The diazotization, coupling and dye recovery operations can be carried out in accordance with the procedure described in Example 1. The dye compound obtained colors cellulose acetate rayon and nylon red shades.

*Example 10.—1-(4-nitrophenylazo)-2 - methoxy-4-N-difluoromethylaminobenzene*

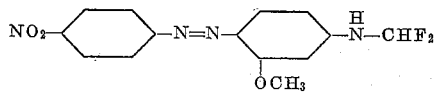

13.8 grams of p-nitroaniline are diazotized and the diazonium compound obtained is coupled with 17.3 grams of N-difluoromethyl-m-methoxy-aniline. The diazotization, coupling and dye recovery operations can be carried out in accordance with the procedure described in Example 1. The dye compound obtained colors cellulose acetate rayon and nylon red shades.

*Example 11.—1 - (4 - acetophenylazo) - 4 - (N-β-methoxyethyl-N-difluoroethyl)-aminobenzene*

13.5 grams of p-aminoacetophenone are diazotized and the diazonium compound obtained is coupled with 21.5 grams of N-β-methoxyethyl-N-difluoroethylaniline. The diazotization, coupling and dye recovery operations can be carried out in accordance with the procedure described in Example 1. The dye compound obtained colors cellulose acetate rayon and nylon orange shades.

By the use of 22.9 grams of N-β-ethoxyethyl-N-difluoroethylaniline in the foregoing example, a dye compound is obtained which similarly colors cellulose acetate rayon and nylon orange shades.

*Example 12.—1-(2-cyano-4-nitrophenylazo) - 4-(N-4,5-dihydroxyamyl-N-difluoroethyl) - aminobenzene*

14.7 grams of 1-amino-2-cyano-4-nitrobenzene are diazotized and the diazonium compound obtained is coupled with 25.9 grams of N-4,5-dihydroxyamyl-N-difluoroethylaniline. The diazotization, coupling and dye recovery operations can be carried out in accordance with the precedure described in Example 1. The dye compound obtained colors cellulose acetate rayon and nylon rubine shades.

*Example 13.—1-(4-propionylphenylazo)-4-(N-β-phosphatoethyl - N - difluoroethyl)-aminobenzene*

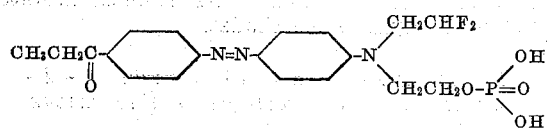

14.9 grams of 1-amino-4-propionylbenzene are diazotized and the diazonium compound obtained is coupled with 28.2 grams of N-β-phosphatoethyl-N-difluoroethylaniline. The coupling reaction can be carried out in a cold dilute sulfuric acid or hydrochloric acid solution. The dye compound obtained colors cellulose acetate rayon and nylon orange shades. The formula given for the compound is that for its free acid form. As will be understood by those in the art to whom this invention is directed, the dye, depending upon its method of recovery, can be obtained in either the free acid or salt form such as the sodium, potassium or ammonium salt form.

*Example 14.—1-(4-nitrophenylazo)-2-methyl-4-(methyl ester of N-β-carboxyethyl-N-difluoroethyl)-aminobenzene*

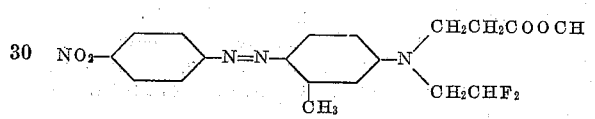

13.8 grams of p-nitroaniline are diazotized and the diazonium compound obtained is coupled with 25.7 grams of the methyl ester of N-β-carboxyethyl-N-difluoroethyl-m-toluidine. The diazotization, coupling and dye recovery operations can be carried out in accordance with the procedure described in Example 1. The dye compound obtained colors cellulose acetate rayon and nylon orange-red shades.

By the use of 27.1 grams of the ethyl ester of N - β - carboxyethyl - N - difluoroethyl - m - toluidine in the foregoing example a dye compound is obtained which similarly colors cellulose acetate rayon and nylon orange-red shades.

*Example 15.—1 - (4 - nitrophenylazo) - 4 - (N - cyanoethyl-N-difluoroethyl)-aminobenzene*

13.8 grams of p-nitroaniline are diazotized and the diazonium compound obtained is coupled with 18.2 grams of N-cyanoethyl-N-difluoroethylaniline. The diazotization, coupling, and dye recovery operations can be carried out in accordance with the procedure described in Example 1. The dye compound obtained colors cellulose acetate rayon and nylon orange shades.

*Example 16.—1 - (2,4 - dinitro - 6 - N - ethylsulfamylphenylazo) - 4 - (N - β - hydroxypropyl-N - difluoroethyl) - aminobenzene*

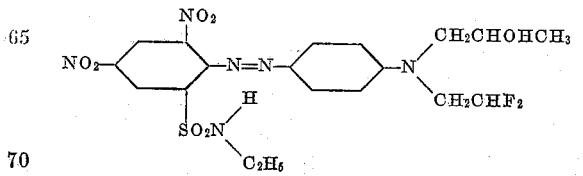

29.2 grams of 1-amino-6-N-ethylsulfamyl-2,4-dinitrobenzene are diazotized and the diazonium compound obtained is coupled with 21.5 grams of N - β - hydroxypropyl - N - difluoroethylaniline. The diazotization, coupling and dye recovery operations are carried out in accordance with the procedure described in Example 6. The dye compound obtained colors cellulose acetate rayon and nylon violet shades.

*Example 17.*—1 - (4 - nitrophenylazo) - 4 - [(N,N - di) - difluoroethyl] - aminobenzene 13.8 grams of p-nitroaniline are diazotized and coupled with 22.1 grams of [(N,N-di)-difluoroethyl]-aniline. The diazotization, coupling and dye recovery operations can be carried out in accordance with the procedure described in Example 1. The dye compound obtained colors cellulose acetate rayon and nylon orange shades.

*Example 18*

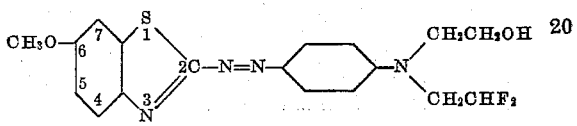

18 grams of 2-amino-6-methoxybenzothiazole are diazotized in known fashion (in a formic acid medium, for example) and the diazonium compound obtained is coupled in a dilute hydrochloric acid medium with 20.1 grams of N-β-hydroxyethyl-N-difluoroethylaniline. The dye compound obtained colors cellulose acetate rayon and nylon red shades.

*Example 19*

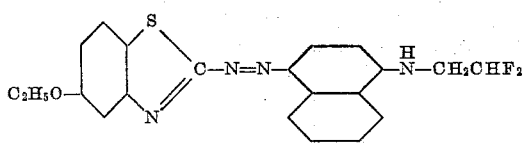

19.4 grams of 2-amino-5-ethoxybenzothiazole are diazotized and coupled in an acid medium with 20.7 grams of N-difluoroethyl-α-naphthylamine. The dye compound obtained colors cellulose acetate rayon and nylon rubine shades.

*Example 20*

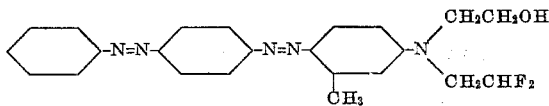

19.7 grams of p-aminoazobenzene are diazotized and the diazonium compound obtained is coupled in an acid medium with 21.5 grams of N - β - hydroxyethyl - N - difluoroethyl - m - toluidine. The dye compound obtained colors cellulose acetate rayon and nylon red shades.

*Example 21*

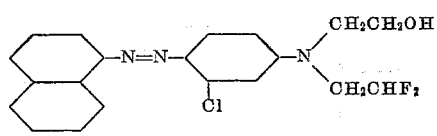

14.3 grams of α-naphthylamine are diazotized and the diazonium compound obtained is coupled with 23.5 grams of N-β-hydroxyethyl-N-difluoroethyl-m-chloroaniline. The diazotization, coupling and dye recovery operations can be carried out in accordance with the procedure described in Example 1. The dye compound obtained colors cellulose acetate rayon, nylon and silk yellowish-orange shades.

*Example 22*

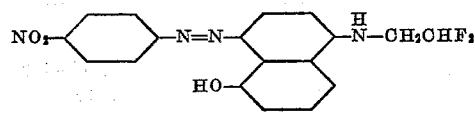

13.8 grams of p-nitroaniline are diazotized and the diazonium compound obtained is coupled in a slightly acid medium with 22.3 grams of 5-hydroxy - 1 - difluoroethylaminonaphthalene. The dye compound obtained colors cellulose acetate rayon, nylon and silk violet shades.

*Example 23*

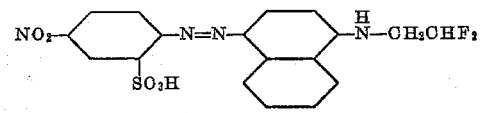

21.8 grams of 1-amino-2-sulfonic-4-nitrobenzene are diazotized in known fashion and the diazonium compound obtained is coupled in an acid medium with 20.7 grams of N-difluoroethyl-α-naphthylamine. The dye compound obtained colors silk, wool, and nylon rubine shades.

*Example 24*

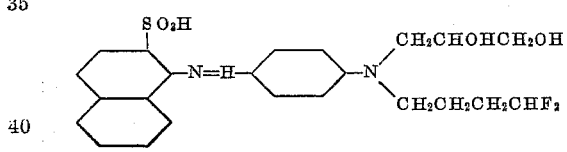

22.3 grams of 1-amino-2-sulfonic naphthalene are diazotized and the diazonium compound obtained is coupled in an acid medium with 25.8 grams of N-β,γ-dihydroxypropyl-N-difluorobutylaniline. The dye compound obtained colors silk, wool and nylon orange shades.

*Example 25*

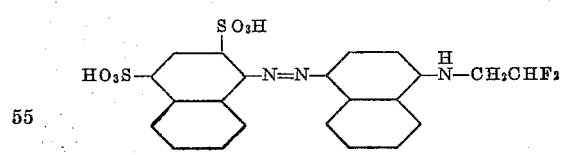

30.1 grams of 1-amino-2,4-disulfonicnaphthalene are diazotized and the diazonium compound obtained is coupled in an acid medium with 20.7 grams of N-difluoroethyl-α-naphthylamine. The dye compound obtained colors silk, wool and nylon violet shades.

The following tabulation further illustrates the compounds included within the scope of my invention together with the color they produce on cellulose acetate rayon and nylon. The compounds indicated below may be prepared by diazotizing the amines listed under the heading "Amine" and coupling the diazonium compounds obtained with the compounds specified in the column entitled "Coupling Component." The diazotization and coupling reactions may, for example, be carried out following the general procedure described in the foregoing examples.

Tabulation A

| Amine | Coupling Component | Color |
|---|---|---|
| p-aminoacetophenone | (1) N-difluoroethylaniline | Orange. |
| Do | (2) N-difluoroethyl-o-chloroaniline | Do. |
| Do | (3) N-difluoroethyl-N-β-hydroxyethylaniline | Do. |
| Do | (4) N-difluoroethyl-N-β-hydroxyethyl-m-chloroaniline | Do. |
| Do | (5) N-difluoroethyl-N-β-hydroxyethyl-m-acetaminoaniline | Do. |
| Do | (6) N-difluoroethyl-N-β-hydroxyethyl-m-toluidine | Do. |
| Do | (7) N-difluoroethyl-N-β-hydroxyethyl-2-methoxy-5-methylaniline | Do. |
| Do | (8) N-difluoroethyl-N-β,γ-dihydroxypropyl-m-toluidine | Do. |
| Do | (9) N-difluoroethyl-N-β,γ-dihydroxypropyl-m-anisidine | Do. |
| Do | (10) N-difluoroethyl-N-β,γ-dihydroxypropyl-m-chloroaniline | Do. |
| Do | (11) N-difluoroethyl-N-β,γ-dihydroxypropyl-2-methoxy-5-methylaniline | Do. |
| Do | (12) N-difluoroethyl-N-β,γ-dihydroxypropyl-2-methoxy-5-acetaminoaniline | Do. |
| Do | (13) N-difluoroethyl-N-β-hydroxypropylaniline | Do. |
| Do | (14) N-difluoroethyl-N-β-hydroxypropyl-m-fluoroaniline | Do. |
| Do | (15) N-difluoroethyl-N-β-hydroxypropyl-m-toluidine | Do. |
| Do | (16) N-difluoroethyl-N-γ-hydroxypropylaniline | Do. |
| Do | (17) N-difluoroethyl-N-γ-hydroxypropyl-m-toluidine | Do. |
| Do | (18) N-difluoroethyl-N-delta-hydroxybutylaniline | Do. |
| Do | (19) N-difluoroethyl-N-delta-hydroxybutyl-m-toluidine | Do. |
| Do | (20) N-difluoroethyl-N-β,γ-delta-trihydroxybutylaniline | Do. |
| Do | (21) N-difluoroethyl-N-5-hydroxy-n-amylaniline | Do. |
| Do | (22) N-difluoroethyl-N-4,5-dihydroxyamylaniline | Do. |
| Do | (23) N-2,2-difluoro-n-propylaniline | Do. |
| Do | (24) N-2,2-difluoro-n-propyl-N-β-hydroxyethylaniline | Do. |
| Do | (25) N-2,2-difluoro-n-propyl-N-β-hydroxyethyl-m-toluidine | Do. |
| Do | (26) N-2,2-difluoro-n-propyl-N-β,γ-dihydroxypropylaniline | Do. |
| Do | (27) N-2,2-difluoro-n-propyl-N-β,γ-dihydroxypropyl-m-toluidine | Do. |
| Do | (28) N-2,2-difluoro-n-propyl-N-β,γ-dihydroxypropyl-m-anisidine | Do. |
| Do | (29) N-2,2-difluoro-n-propyl-N-β,γ-delta-trihydroxybutyl-m-toluidine | Do. |
| Do | (30) N-2,2-difluoro-n-propyl-N-β,γ-delta-trihydroxybutyl-m-ethylaniline | Do. |
| Do | (31) N-3,3-difluoropropylaniline | Do. |
| Do | (32) N-3,3-difluoropropyl-N-β,γ-dihydroxypropylaniline | Do. |
| Do | (33) N-3,3-difluoro-n-butylaniline | Do. |
| Do | (34) N-3,3-difluoro-n-butyl-N-β-hydroxyethylaniline | Do. |
| Do | (35) N-3,3-difluoro-n-butyl-N-β,γ-dihydroxypropyl-m-toluidine | Do. |
| Do | (36) N-3,3-difluoro-n-butyl-N-β,γ-dihydroxypropyl-2-methoxy-5-methylaniline | Do. |
| Do | (37) N-3,3-difluoro-n-butyl-N-4,5-dihydroxyamylaniline | Do. |
| Do | (38) N-difluoromethyl-N-β-hydroxyethylaniline | Do. |
| Do | (39) (N,N-di)-difluoromethyl-m-toluidine | Do. |
| Do | (40) N-difluoroethyl-N-trifluoroethylaniline | Do. |
| Do | (41) N-difluoroethyl-N-trifluoropropylaniline | Do. |
| Do | (42) N-difluoroethyl-N-6,6,6-trifluorohexyl-m-toluidine | Do. |
| Do | (43) N-2,2-difluoro-n-propyl-N-trifluorobutylaniline | Do. |
| Do | (44) N-3,3-difluoro-n-butyl-N-trifluoroethylaniline | Do. |
| Do | (45) N-3,3-difluoro-n-butyl-N-difluoroethyl-m-toluidine | Do. |
| aniline | Coupling Components 1 to 45 | Yellow to yellowish-orange. |
| p-nitroaniline | do | Orange to rubine. |
| 2-methyl-4-nitroaniline | do | Do. |
| 2-methoxy-4-nitroaniline | do | Do. |
| 2-hydroxy-4-nitroaniline | do | Pinkish-orange to pinkish-rubine. |
| 2-aceto-4-nitroaniline | do | Orange to rubine. |
| 2-chloro-4-nitroaniline | do | Do. |
| 2-bromo-4-nitroaniline | do | Do. |
| 2-fluoro-4-nitroaniline | do | Do. |
| 2-iodo-4-nitroaniline | do | Do. |
| 2,4-dinitroaniline | do | Orange to violet. |
| 6-chloro-2,4-dinitroaniline | do | Red to blue. |
| 6-bromo-2,4-dinitroaniline | do | Do. |
| 6-fluoro-2,4-dinitroaniline | do | Do. |
| 6-hydroxy-2,4-dinitroaniline | do | Do. |
| 6-N-ethylsulfamyl-2,4-dinitroaniline | do | Do. |
| 6-N-methylsulfamyl-2,4-dinitroaniline | do | Do. |
| 6-N-β-methoxyethylsulfamyl-2,4-dinitroaniline | do | Do. |
| 6-cyano-2,4-dinitroaniline | do | Do. |
| 2-amino-3,5-dinitrophenylmethylketone | do | Do. |
| 2-amino-3,5-dinitrophenylmethylsulfone | do | Do. |
| 2-amino-3,5-dinitrotrifluoromethylbenzene | do | Do. |
| 2-amino-3,5-dinitrophenyltrifluoromethylsulfone | do | Do. |
| 2,4,6-trinitroaniline | do | Do. |
| o-aminophenylmethylsulfone | do | Do. |
| p-aminophenylmethylsulfone | do | Yellow to orange. |
| 2-nitro-4-thiocyanoaniline | do | Do. |
| 2-amino-5-nitrobenzotrifluoride | do | Orange to rubine. |

Tabulation A—Continued

| Amine | Coupling Component | Color |
|---|---|---|
| 2,6-dichloro-4-nitroaniline | ...do... | Reddish-brown to brownish-rubine. |
| 6-bromo-2-chloro-4-nitroaniline | ...do... | Do. |
| 6-fluoro-2-chloro-4-nitroaniline | ...do... | Do. |
| α-naphtylamine | ...do... | Yellow to orange. |
| 1-amino-2,4-dinitronaphthalene | ...do... | Orange to violet. |
| 1-amino-5-hydroxynaphthalene | ...do... | Orange to rubine. |
| p-aminoazobenzene | ...do... | Do. |
| 2'-chloro-4'-nitro-p-aminoazobenzene | ...do... | Do. |
| 2-amino-5-ethoxybenzothiazole | ...do... | Do. |
| 2-amino-5-methoxybenzothiazole | ...do... | Do. |

The compounds indicated in the following tabulation can be prepared following the procedure described in the examples given hereinbefore. They color cellulose acetate rayon and nylon the colors set forth.

ponents used in their manufacture is described hereinafter.

The benzene coupling components of the invention can be prepared by reacting a chlorobenzene compound with a difluoroalkylamine. If desired,

Tabulation B

| Amine | Coupling Component | Color |
|---|---|---|
| p-nitroaniline | (1) 5-hydroxy-1-difluoroethylaminonaphthalene | Violet. |
| Do | (2) 5-hydroxy-1-(2,2-difluoro-n-propyl)-aminonaphthalene. | Do. |
| Do | (3) 2-ethoxy-1-difluoroethylamino-naphthalene | Rubine. |
| Do | (4) 6-chloro-5-hydroxy-1-difluoroethylaminonaphthalene. | Violet. |
| Do | (5) 6-bromo-5-hydroxy-1-(3,3-difluoro-n-butyl)-aminonaphthalene. | Do. |
| p-aminoacetophenone | Coupling Components 1-5 above | Red. |
| 2-hydroxy-4-nitroaniline | ...do... | Violet. |
| 2-chloro-4-nitroaniline | ...do... | Do. |
| o-aminophenylmethyl-sulfone | ...do... | Red. |
| 6-N-ethylsulfamyl-2,4-dinitroaniline | ...do... | Blue. |
| p-aminoazobenzene | ...do... | Reddish-violet. |
| α-naphthylamine | ...do... | Orange. |
| 2,4-dinitro-α-naphthylamine | ...do... | Blue. |
| 6-ethoxybenzothiazole | ...do... | Violet. |
| 5-methoxybenzothiazole | ...do... | Do. |

Similarly, the compounds indicated in the following tabulation can be prepared following the procedure described in the examples given hereinbefore. They color silk, wool and nylon textile materials red, orange, orange-yellow, rubine and violet shades, for example.

a catalyst for the reaction such as powdered copper and cuprous oxide can be employed. The benzene coupling compounds of the invention can also be prepared by reaction between an aminobenzene compound and a difluoroalkanol in the presence of a metallic hydrogenation catalyst such

Tabulation C

| Amine | Coupling Component |
|---|---|
| 1-amino-4-nitro-2-sulfonicbenzene | (1) N-difluoroethylaniline. |
| Do | (2) N-difluoroethyl-N-β-hydroxyethylaniline. |
| Do | (3) N-difluoroethyl-N-β-hydroxyethyl-m-toluidine. |
| Do | (4) N-difluoroethyl-N-4,5-dihydroxyamylaniline. |
| Do | (5) (N,N-di)-difluoroethylaniline. |
| Do | (6) N-2,2-difluoro-n-propyl-N-β-hydroxyethylaniline. |
| Do | (7) N-2,2-difluoro-n-propyl-N-β,γ-dihydroxypropyl-m-toluidine. |
| Do | (8) 5-hydroxy-1-difluoroethylaminonaphthalene. |
| Do | (9) 1-difluoroethylaminonaphthalene. |
| p-sulfanilic acid | Coupling Components 1-9 above. |
| 1-amino-2-chloro-4-sulfonicbenzene | Do. |
| 1-amino-2,4-disulfonicbenzene | Do. |
| 1-amino-2-sulfonicnaphthalene | Do. |
| 1-amino-2-hydroxy-4-sulfonicnaphthalene | Do. |
| 2-naphthylamine-8-sulfonic acid | Do. |

It will be understood that the compounds shown in the foregoing examples and tabulations are illustrative and not limitative of my invention since any of the diazonium compounds indicated herein can be coupled with any of the coupling components indicated herein. Additional sulfonated arylamines that can be diazotized and coupled with the coupling components shown herein include, for example, metanilic acid, 1-amino-3-sulfonicnaphthalene, 1-amino-5-sulfonicnaphthalene, 1-amino-6-sulfonicnaphthalene, 1-amino-3,8-disulfonicnaphthalene, 1-amino-4,8-disulfonicnaphthalene and 1-amino-5-hydroxy-7-sulfonicnaphthalene.

In order that my invention may be clearly understood the preparation of the coupling com- as Raney nickel and other nickel catalysts, a cobalt catalyst and copper chromite. A still further method by which the coupling compounds of the invention can be prepared is by reaction between an aminobenzene compound and a difluoroalkyl halide in the presence of an acid binding agent. Acid binding agents that can be used include, for example, sodium carbonate, potassium carbonate, sodium hydroxide, potassium hydroxide, sodium bicarbonate, potassium bicarbonate and barium hydroxide. Each of these methods of preparation is illustrated hereinafter.

Difluoroalkylamines that can be used in the preparation of the coupling compounds of my invention include, for example, 2,2-difluoroethylamine ($CHF_2CH_2NH_2$), di-(2,2-difluoro)-diethylamine $(CHF_2CH_2)_2NH$, 2,2-difluoro-n-propyl-amine $(CH_3CF_2CH_2NH_2)$ and 3,3-difluoro-n-butylamine $(CH_3CF_2CH_2CH_2NH_2)$. Difluoroalkyl halides that can be employed include, for example, $BrCHF_2$, $ClCHF_2$, $ClCH_2CHF_2$, $BrCH_2CHF_2$, $ICH_2CHF_2$, $ClCH_2CF_2CH_3$ and $ClCH_2CH_2CF_2CH_3$. Difluoroalkanol compounds that can be employed include, for example, 2,2-difluoroethanol $(CHF_2CH_2OH)$.

*Example A.—N-(2,2-difluoroethyl)-aniline*

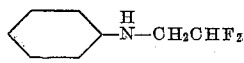

28 grams of chlorobenzene, 81 grams of 2,2-difluoroethylamine, 300 cc. of water, 0.25 gram of copper powder and 0.25 gram of cuprous oxide are heated together in a copper lined shaking autoclave at 220–225° C. for 24 hours with shaking. When cool, the contents of the autoclave are removed and extracted with benzene. After drying, the benzene extract is fractionally distilled under reduced pressure to recover N-(2,2-difluoroethyl)-aniline and unreacted 2,2-difluoroethylamine. N-(2,2-difluoroethyl)-aniline is a colorless liquid.

Using the procedure described in Example A and employing the proper chlorobenzene compound, the following compounds are readily prepared:

N-difluoroethyl-o-chloroaniline
N-difluoroethyl-o-toluidine
N-difluoroethyl-m-toluidine
N-difluoroethyl-o-ethylaniline
N-difluoroethyl-2-methoxy-5-acetaminoaniline By the use of 2,2-difluoro-n-propylamine, 3,3-difluoro-n-butylamine and di-(2,2-difluoro)-diethylamine, respectively, in place of 2,2-difluoroethylamine in Example A, N-(2,2-difluoro-n-propyl)-aniline, N-(3,3-difluoro-n-butyl)-aniline and N,N-di(2,2-difluoroethyl)-aniline, respectively, are obtained. It will be understood that by the use of these amines, aniline compounds, in addition to aniline, containing a 2,2-difluoro-n-propyl group, a 3,3-difluoro-n-butyl group and a di(2,2-difluoroethyl) group on the nuclear amino group can be prepared. Thus, the following compounds, for example, can be prepared:

N-2,2-difluoro-n-propyl)-2-methoxy-5-methylaniline
N-(2,2-difluoro-n-propyl)-m-propionylaminoaniline
N-(3,3-difluoro-n-butyl)-m-toluidine
N,N-di-(2,2-difluoroethyl)-m-toluidine
N,N-di-(2,2-difluoroethyl)-m-chloroaniline

*Example B.—N-(2,2-difluoroethyl)-m-toluidine*

47 grams of m-toluidine, 74 grams of 2,2-difluoroethanol and 5 grams of Raney nickel are heated together in a shaking autoclave for 25 hours. When cool, the contents of the autoclave are removed and filtered to remove nickel and the filtrate is fractionated under reduced pressure, (6 mm., for example). N-(2,2-difluoroethyl)-m-toluidine is obtained in a good yield.

Using the procedure described in Example B, the following compounds are readily prepared:

N-difluoroethyl-o-fluoroaniline
N-difluoroethyl-o-anisidine
N-difluoroethyl-2-methoxy-5-methylaniline
N-difluoroethyl-m-n-butyrylaminoaniline

*Example C.—N-(2,2-difluoroethyl)-o-chloroaniline*

15 grams of 2,2-difluoroethylbromide, 13.8 grams of o-chloroaniline and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure (2 mm., for example) to give a good yield of N-(2,2-difluoroethyl)-o-chloroaniline.

*Example D.—N,N-di-(difluoroethyl)-aniline*

15.7 grams of N-difluoroethyl-m-toluidine, 15 grams of difluoroethylbromide and 6 grams of sodium carbonate are placed in a suitable reaction vessel and heated under refluxing conditions until carbon dioxide ceases to be evolved. The reaction product is extracted with ethyl alcohol and the ethyl alcohol extract is fractionated under reduced pressure (5 mm., for example) to give a good yield of N,N-di-(difluoroethyl)-aniline.

*Example E.—N-trifluoroethyl-N-difluoroethylaniline*

This compound is obtained by reacting N-difluoroethyl aniline with 2,2,2-trifluoroethylbromide $(CF_3CH_2Br)$ in accordance with the procedure described in Example D.

*Example F.—N-difluoromethyl-N-difluoroethylaniline*

This compound is obtained by reacting N-difluoroethylaniline with 2,2-difluoromethylbromide $(BrCHF_2)$ in accordance with the procedure described in Example D.

*Example G.—N-β-methoxyethyl-N-difluoroethylaniline*

This compound can be obtained by reacting N-β-methoxyethylaniline with 2,2-difluoroethylbromide in accordance with the procedure described in Example D.

Following the procedure set forth in Examples C, D, E, F and G the following compounds, for example, are readily prepared:

(N,N-di)-difluoroethyl-m-toluidine
(N,N-di)-difluoroethyl-m-anisidine
(N,N-di)-difluoroethyl-m-bromoaniline
(N,N-di)-difluoroethyl-m-fluoroaniline
N,N-di-(2,2-difluoro-n-propyl)-m-chloroaniline
N,N-di-(3,3-difluoro-n-butyl)-aniline
N-difluoroethyl-N-(2,2-difluoro-n-propyl)-aniline
N-difluoroethyl-N-(3,3-difluoro-n-butyl)-m-toluidine
N-3,3-difluoropropyl-N-trifluoroethylaniline
N-3,3-difluoropropyl-N-trifluoroethyl-m-toluidine
N-3,3-difluoro-n-butyl-N-trifluoroethylaniline
N-3,3-difluoro-n-butyl-N-trifluoroethyl-m-toluidine
N-3,3-difluoro-n-butyl-N-trifluoropropylaniline
N-3,3-difluoro-n-butyl-N-trifluoropropyl-m-toluidine
N-3,3-difluoro-n-butyl-N-trifluorobutylaniline
N-β-ethoxyethyl-N-difluoroethylaniline
N-β-methoxyethyl-N-(3,3-difluoro-n-butyl)-aniline The trifluoroethyl, the trifluoropropyl, and the trifluorobutyl group can be introduced by reacting an aniline compound having a replaceable hydrogen atom on the amino group with an equivalent gram molecular weight of $CF_3CH_2Cl$ or $CF_3CH_2Br$, $CF_3CH_2CH_2Cl$ and $CF_3CH_2CH_2CH_2Cl$, respectively, in accordance with the procedure set forth in Examples C, D, E, F and G.

*Example H.—N-β-hydroxyethyl-N-difluoroethylaniline*

15.7 grams of N-difluoroethylaniline, 5 grams of ethylene oxide and 50 cc. of dioxane are heated together with stirring in an autoclave at 180° C. for six hours. Upon cooling, the reaction mixture is removed from the autoclave and distilled under reduced pressure. A good yield of N-β-hydroxyethyl-N-difluoroethylaniline is obtained.

Using the procedure described in Example H and employing the proper alkylene oxide, (trimethylene oxide, propylene oxide, glycidol, and β-methyl glycidol, etc.), the following compounds are readily prepared:

N-β-hydroxypropyl-N-difluoroethylaniline
N-γ-hydroxypropyl-N-difluoroethylaniline
N-β,γ-dihydroxypropyl-N-difluoroethylaniline
N-4,5-dihydroxyamyl-N-difluoroethylaniline
N-β-methyl-β,γ-dihydroxypropyl-N-difluoroethylaniline
N-β-methyl-β,γ-dihydroxypropyl-N-difluoroethyl-m-toluidine
N-β-hydroxyethyl-N-difluoroethyl-m-butoxyaniline
N-β,γ-dihydroxypropyl-N-2,2-difluoro-N-propyl-m-toluidine
N-β,γ-dihydroxypropyl-N-3,3-difluoro-n-butyl-m-toluidine Where a β,γ-dihydroxypropyl group or other group which will decompose if the compound is attempted to be distilled is present, the reaction mixture is removed from the reaction vessel, filtered if desired and the solvent material removed by distillation under reduced pressure, leaving the desired product as a residue of the distillation.

*Example I.—N-β-hydroxyethyl-N-difluoroethyl-m-chloroaniline*

19.1 grams of N-difluoroethyl-m-chloroaniline, 5 grams of ethylene oxide and 50 cc. of dioxane are heated together with stirring in an autoclave at 180° C. for 6 hours. Upon cooling, the reaction mixture is removed from the autoclave and distilled under reduced pressure. A good yield of N-β-hydroxyethyl-N-difluoroethyl-m-chloroaniline is obtained.

Similarly by the use of 17.1 grams of N-difluoroethyl-m-toluidine in place of N-difluoroethyl-m-chloroaniline, a good yield of N-β-hydroxyethyl - N - difluoroethyl - m - toluidine is obtained.

*Example J.—N-β,γ-dihydroxypropyl-N-difluoroethyl-2-methoxy-5-acetaminoaniline*

24.4 grams of N-difluoroethyl-2-methoxy-5-acetaminoaniline and 10.6 grams of sodium carbonate are mixed together and heated with stirring in a suitable reaction vessel in an atmosphere of nitrogen to 140° C. Then 12 grams of glycerolchlorohydrin ($ClCH_2CHOHCH_2OH$) are added drop by drop with stirring over a period of three hours, while maintaining the temperature at 140° C. When carbon dioxide ceases to be evolved, the reaction mixture is extracted with acetic acid and the acetic acid extract is carefully fractionated under reduced pressure to remove the acetic acid. N-β,γ-dihydroxypropyl-N-difluoroethyl - 2 - methoxy-5 acetaminoaniline is obtained as a dark, viscous product and is stored in a stoppered bottle.

Where the intermediate is to be used as a coupling component in the preparation of azo dyes the fractionation operation may be omitted and the acetic acid extract stored and used as such. If desired, the reaction mixture can be extracted with butyl alcohol and the desired product recovered by removing the butyl alcohol by distillation or evaporation.

The process described in Example J is broadly applicable. In place of the chlorohydrin used in the example ethylene chlorohydrin, trimethylene chlorohydrin, β-methyl-β,γ-dihydroxypropylchlorohydrin, propylene chlorohydrin and 1-chloro-2,3,4-trihydroxybutane, for example, can be used to obtain coupling compounds of the invention.

Using the procedure described in Examples H, I and J the following compounds, for example, are readily prepared:

N - difluoroethyl - N - β - hydroxyethyl - m - acetaminoaniline
N - difluoroethyl - N - β - hydroxyethyl - 2 - methoxy-5-methylaniline
N-difluoroethyl-N-β-hydroxypropylaniline
N - difluoroethyl - N - β - hydroxypropyl - m - toluidine
N - difluoroethyl - N - β,γ - dihydroxypropyl - m-toluidine
N - difluoroethyl - N - β,γ - dihydroxypropyl - m-chloroaniline
N-difluoroethyl-N-γ-hydroxypropylaniline
N-difluoroethyl-N-delta-hydroxybutylaniline
N - difluoroethyl - N - delta - hydroxybutyl - m - toluidine
N-difluoroethyl-N-2,3,4-trihydroxybutylaniline
N-difluoroethyl-N-ω-hydroxy-n-amylaniline
N - 2,2 - difluoro - n - propyl - N - β - hydroxy - ethyl-m-toluidine
N - 2,2 - difluoro - n - propyl - N - β,γ - dihydroxypropylaniline
N - 2,2 - difluoro - n - propyl - N - 2,3,4 - tri - hydroxybutyl-m-ethylaniline
N - 3,3 - difluoro - n - butyl - N - β - hydroxyethylaniline
N - 3,3 - difluoro - n - butyl - N - 4,5 - dihydroxy - amylaniline

*Example K.—Methyl ester of N-β-carboxyethyl-N-difluoroethylaniline*

17.9 grams of the methyl ester of N-β-carboxyethylaniline, 15.1 grams of difluoroethylbromide and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure, 5 mm., for example, to give a good yield of the methyl ester of N-β-carboxy-ethyl-N-difluoroethylaniline.

Using the procedure described in Example K, the following compounds are readily prepared:

Methyl ester of N - β - carboxyethyl-N-difluoroethyl-m-toluidine

Methyl ester of N-β-carboxyethyl-N-difluoroethyl-m-anisidine

Methyl ester of N-β-carboxyethyl-N-2,2-difluoro-n-propylaniline

Methyl ester of N-β-carboxyethyl-N-3,3-difluoro-n-butylaniline

By the use of an equivalent gram molecular weight of the ethyl ester of N-β-carboxyethylaniline for the methyl ester of N-β-carboxyethylaniline, the corresponding ethyl ester compounds can be prepared.

*Example L.—N-γ-ketobutyl-N-difluoroethylaniline*

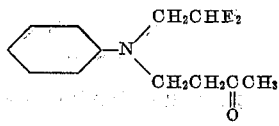

16 grams of N-γ-ketobutylaniline, 15.1 grams of difluoroethylbromide and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure (3 mm., for example) to give a good yield of N-γ-ketobutyl-N-difluoroethylaniline.

Using the procedure described in Example L, the following compounds are readily prepared:

N-γ-ketobutyl-N-difluoroethyl-m-toluidine
N-γ-ketobutyl-N-difluoroethyl-2-methoxy-5-acetaminoaniline
N-β-ketopropyl-N-difluoroethylaniline
N-γ-ketoamyl-N-difluoroethylaniline
N-γ-ketobutyl-N-(2,2-difluoro-n-propyl)-aniline
N-γ-ketobutyl-N-(3,3-difluoro-n-butyl)-aniline

*Example M.—N-β-cyanoethyl-N-difluoroethylaniline*

18 grams of N-difluoroethylaniline, 30 grams of acrylonitrile and 2 cc. of sulfuric acid are placed in a suitable reaction vessel and heated on a steam bath for several weeks. The sulfuric acid is then carefully neutralized by the addition of sodium hydroxide and the reaction mixture is fractionated under reduced pressure. A good yield of N-β-cyanoethyl-N-difluoroethylaniline is obtained.

Using the procedure described in Example M, the following compounds are readily prepared:

N-β-cyanoethyl-N-difluoroethyl-m-toluidine
N-β-cyanoethyl-N-(2,2-difluoro-n-propyl)-aniline
N-β-cyanoethyl-N-(3,3-difluoro-n-butyl)-aniline

*Example N.—N-(6,6,6-trifluorohexyl)-N-difluoroethylaniline*

28 grams of chlorobenzene, 170 grams of 6,6,6-trifluorohexylamine, 300 cc. of water, 0.25 gram of copper powder and 0.25 gram of cuprous oxide are heated together in a copper-lined shaking autoclave at 220–225° C. for 24 hours with shaking. When cool, the contents of the autoclave are removed and extracted with benzene. After drying, the benzene extract is fractionally distilled under reduced pressure to recover N-(6,6,6-trifluorohexyl)-aniline and unreacted 6,6,6-trifluorohexylamine. 156 grams of 5,5,5-trifluoroamylamine can be substituted for the 6,6,6-trifluorohexylamine of the example to obtain N-(5,5,5-trifluoroamyl)-aniline. 23.1 grams of N-(6,6,6-trifluorohexyl)-aniline, 15.1 grams of difluoroethylbromide and 6 grams of sodium carbonate are placed in a suitable reaction vessel and heated under refluxing conditions until carbon dioxide ceases to be evolved. The reaction product is extracted with ethyl alcohol and the ethyl alcohol extract is fractionated under reduced pressure (2 mm., for example) to give a good yield of N-(6,6,6-trifluorohexyl)-N-difluoroethylaniline. Similarly, by the use of 21.7 grams of N-(5,5,5-trifluoroamyl)-aniline in the foregoing reaction, N-(5,5,5-trifluoroamyl)-N-difluoroethylaniline can be obtained.

Using the procedure described hereinbefore, the following compounds are readily prepared:

N-(5,5,5-trifluoroamyl)-N-difluoroethyl-2-methoxy-5-methylbenzene
N-(5,5,5-trifluoroamyl)-N-difluoroethyl-m-toluidine
N-(5,5,5-trifluoroamyl)-N-(2,2-difluoro-n-propyl)-aniline
N-(6,6,6-trifluorohexyl)-N-difluoroethyl-m-toluidine
N-(6,6,6-trifluorohexyl)-N-(3,3-difluoro-n-butyl)-aniline The N-difluoroalkylnaphthylamine coupling components of the invention can be prepared by the general methods described in connection with the N-difluoroalkylaniline coupling components. Thus α-naphthylamine can be reacted with 2,2-difluoroethanol in accordance with the procedure described in Example B to obtain N-difluoroethyl-α-naphthylamine. α-Naphthylamine and 1-amino-5-hydroxynaphthalene, for example, can be reacted with 2,2-difluoroethylbromide in accordance with the procedure described in Example D to obtain N-difluoroethyl-α-naphthylamine and 5-hydroxy-1-difluoroethylaminonaphthalene, respectively. Also α-chloronaphthalene can be reacted with a difluoroalkylamine in accordance with the procedure described in Example A to obtain an N-difluoroalkyl-α-naphthylamine. Thus N-difluoroethyl-α-naphthylamine, N-2,2-difluoro-n-propyl-α-naphthylamine and N-3,3-difluoro-n-butyl-α-naphthylamine, for example, can be prepared by reacting α-chloronaphthalene with 2,2-difluoroethylamine, 2,2-difluoro-n-propylamine and 3,3-difluoro-n-butylamine, respectively.

From the foregoing it is believed that the manner of preparation of the N-difluoroalkylnaphthylamine compounds of my invention is clear to those skilled in the art to which this invention is directed and no further description of their preparation is thought necessary.

The azo compounds of my invention can be employed for the coloration of the materials named herein by the well known methods, employed by those skilled in the art, for the coloration of these materials.

N-difluoroalkylaminobenzene compounds are described and claimed in my copending application Ser. No. 624,943, filed October 26, 1945. Reference may be had to this application for additional information concerning the preparation of these compounds.

N-trifluoroalkylaminobenzene compounds are described and claimed in my copending application Serial No. 624,942, filed October 26, 1945. Reference may be had to this application for additional information concerning the preparation of these compounds.

Azo compounds containing an amino group which is substituted with an aliphatic hydrocarbon group containing a trifluorinated carbon atom are described and claimed in my copending application Serial No. 631,469, filed November 28, 1945.

I claim:

1. An azo compound free from nuclear sulfonic and carboxylic acid groups having the general formula:

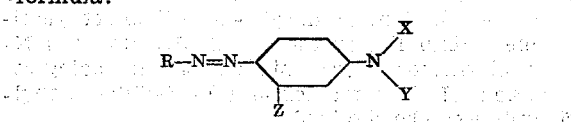

wherein R represents a mono nitrated monocyclic benzene nucleus and wherein said nitro group is in para position to the azo bond, X represents a member selected from the group consisting of a 2,2-difluoroethyl group, a 2,2-difluoro-n-propyl group, a 3,3-difluoropropyl group, a 3,3-difluoro-n-butyl group and a 4,4-difluorobutyl group, Y represents a member selected from the group consisting of a hydrogen atom and a hydroxyalkyl group having 2 to 5, inclusive, carbon atoms therefor and Z represents a member selected from the group consisting of a hydrogen atom, a chlorine atom and a methyl group.

2. An azo compound having the general formula:

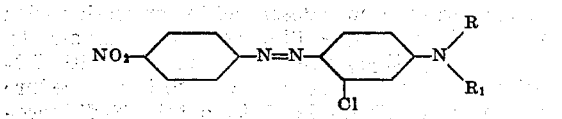

wherein R represents a difluorinated straight chain alkyl group having 2 to 4 carbon atoms and wherein said fluorine atoms are on a single carbon atom and $R_1$ represents a hydroxyalkyl group having 2 to 5, inclusive, carbon atoms.

3. An azo compound having the general formula:

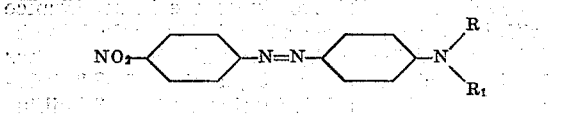

wherein R represents a difluorinated straight chain alkyl group having 2 to 4 carbon atoms and wherein said fluorine atoms are on a single carbon atom and $R_1$ represents a hydroxyalkyl group having 2 to 5, inclusive, carbon atoms.

4. An azo compound having the general formula:

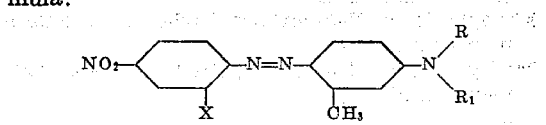

wherein X represents a halogen atom, R represents a difluorinated straight chain alkyl group having 2 to 4 carbon atoms and wherein said fluorine atoms are on a single carbon atom and $R_1$ represents a hydroxyalkyl group having 2 to 5, inclusive carbon atoms.

5. The azo compound having the formula:

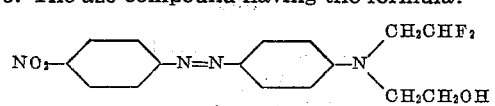

6. The azo compound having the formula:

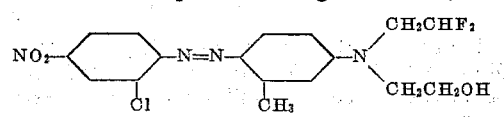

7. The azo compound having the formula:

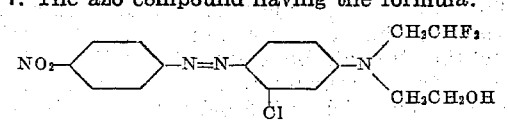

JOSEPH B. DICKEY.

REFERENCES CITED

The following references are of record in the file of this patent:

UNITED STATES PATENTS

| Number | Name | Date |
|---|---|---|
| 2,082,156 | Felix et al. | June 1, 1937 |
| 2,118,661 | Baumann | May 24, 1938 |
| 2,153,018 | Heyna et al. | Apr. 4, 1939 |
| 2,173,417 | Huber | Sept. 19, 1939 |
| 2,194,927 | Daudt et al. | Mar. 26, 1940 |
| 2,408,421 | Grimmel et al. | Oct. 1, 1946 |

FOREIGN PATENTS

| Number | Country | Date |
|---|---|---|
| 209,089 | Switzerland | June 17, 1940 |

OTHER REFERENCES

Gilman: Organic Chemistry, 2nd ed., pages 962, 963 (1943). Pub. John Wiley, New York.